United States Patent [19]

Tokuyama et al.

[11] Patent Number: 4,615,823
[45] Date of Patent: Oct. 7, 1986

[54] DESICCATING AGENT

[75] Inventors: Shinichi Tokuyama, Kyoto; Masaharu Hongo, Uto; Hirokazu Iino, Nishinomiya, all of Japan

[73] Assignee: Nippon Gohsei Kagaku Kogyo Kabushiki Kaisha, Osaka, Japan

[21] Appl. No.: 696,907

[22] Filed: Jan. 31, 1985

[51] Int. Cl.$^4$ ................................................ C09K 3/00
[52] U.S. Cl. ........................................................ 252/194
[58] Field of Search .......................................... 252/194

[56] References Cited

U.S. PATENT DOCUMENTS

| | | | |
|---|---|---|---|
| 2,241,600 | 5/1941 | Hunsicker | 252/194 |
| 2,388,390 | 11/1945 | Cook et al. | 252/194 |
| 2,885,746 | 5/1959 | Güra | 252/194 X |
| 2,933,455 | 4/1960 | Doying | 252/194 |
| 2,957,828 | 10/1960 | Mansfield | 252/194 |
| 2,967,153 | 1/1961 | Houston | 252/194 |
| 3,301,788 | 1/1967 | Cummings et al. | 252/194 |
| 3,704,806 | 12/1972 | Plachenov et al. | 252/194 X |
| 3,779,936 | 12/1973 | Pearce et al. | 252/194 |
| 4,036,360 | 7/1977 | Deffeves | 252/194 X |

FOREIGN PATENT DOCUMENTS 48142 3/1985 Japan ................................... 252/194

*Primary Examiner*—John F. Terapane
*Assistant Examiner*—Matthew A. Thexton
*Attorney, Agent, or Firm*—Antonelli, Terry & Wands

[57] ABSTRACT

A desiccating agent comprising a mixture of
(A) a deliquescent salt
(B) a hydrolyzed copolymer of 50 to 99.8% by mole of vinyl acetate and 50 to 0.2% by mole of an unsaturated dicarboxylic acid in which a degree of hydrolysis of the vinyl acetate component is not less than 70% by mole, and
(C) a short cut fibrous material as main components. The desiccating agent can be re-used at least 10 times and has a high hygroscopic power and capacity.

11 Claims, No Drawings

DESICCATING AGENT

BACKGROUND OF THE INVENTION

The present invention relates to a desiccating agent. There hitherto has been known deliquescent salt such as calcium chloride or magnesium chloride, as a desiccating agent which can absorb moisture in air. It is necessary, however, to be packed in a container, since the salt is deliquesced with absorption of moisture in air. There is a problem that the salt flows around the container, if the container is broken or fallen. And further, when once the salt is deliquesced, it must be thrown away. Because the deliquesced salt can no longer absorb moisture again, even if the salt is sun-dried.

There has been proposed a desiccating agent, that is, calcium chloride carried on continuously porous mineral such as vermiculite or perlite (Japanese Unexamined Patent Publication No. 144021/1982). In accordance with the above-mentioned Patent Publication, there is disclosed an advantage that desiccating agent can absorb much moisture in air without decreasing absorption ratio under high humidity circumstances, but it is not sufficient in a variety of commodity forms.

As a result of study as to a desiccating agent which includes the deliquescent salt as a main component in order to eliminate the above-mentioned disadvantage, the present inventors have proposed a desiccating agent comprising a mixture of (A) a deliquescent salt and (B) a hydrolyzed copolymer of 50 to 99.8% by mole of vinyl acetate and 50 to 0.2% by mole of an unsaturated dicarboxylic acid in which a degree of hydrolysis of the vinyl acetate component is not less than 70% by mole as main components.

The copolymer as the component (B) has some hygroscopic property, but the property is very low in comparison with the component (A). However, the hygroscopic property is synergistically increased by mixing the component (A) and the component (B). Also, the mixture of the component (A) and the component (B) has advantages that it is very easy to deal the mixture, because, even if the mixture is impregnated with much moisture in air under a high humidity circumstances, it is not liquefied and merely becomes a gel form, and that it is not necessary to especially be packed into a container. And further, it is possible that the gel changes again into the original form by being sun-dried under normal condition of temperature and humidity or being placed in low humidity circumstances, and it is very valuable that the gel can be circularly reused.

As a result of the further study, however, the present inventors have found that the above-mentioned desiccating agent can be repeatedly recycled at most five times to some extent. Therefore, when the above desiccating agent is used practically, it is obvious that the number of recycle of the above desiccating agent must be further increased.

SUMMARY OF THE INVENTION

In the present invention, it is possible that a desiccating agent comprising a mixture of the component (A) and the component (B) and (C) a short cut fibrous material is repeatedly recycled at least 10 times, and the desiccating agent is highly practical.

In the present invention, a desiccating agent comprises a mixture of (A) a diliquescent salt (B) a hydrolyzed copolymer of 50 to 99.8% by mole of vinyl acetate and 50 to 0.2% by mole of an unsaturated dicarboxylic acid in which a degree of hydrolysis of the vinyl acetate component is not less than 70% by mole, and (C) a short cut fibrous material as main components.

DETAILED DESCRIPTION

In the present invention, the deliquescent salt as the component (A) is not only calcium chloride per se, but also calcium chloride having a water of crystallization such as calcium chloride dihydrate, tetrahydrate or hexahydrate; magnesium chloride; lithium chloride; or the like. Calcium chloride is more practical in viewpoint of efficiency or cost.

The component (B) is hydrolyzed copolymer of 50 to 99.8% by mole of vinyl acetate and 50 to 0.2% by mole of an unsaturated dicarboxylic acid in which a degree of hydrolysis of the vinyl acetate component is not less than 70% by mole. There is a problem that, outside the above range, the moisture absorption power of the component (B) lowers. More preferably, there used a hydrolyzed copolymer of 80 to 99.8% by mole of vinyl acetate and 20 to 0.2% by mole of an unsaturated dicarboxylic acid in which a degree of hydrolysis of the vinyl acetate component is not less than 70% by mole.

Examples of the unsaturated carboxylic acid are maleic acid (anhydride), fumaric acid, itaconic acid, glutaconic acid, allylmalonic acid, or the like, or their monoesters or diesters such as methyl, ethyl and propyl esters.

And further, the component (B) can be copolymerized with a small amount of copolymerizable monomer other than vinyl acetate and the unsaturated carboxylic acid. The hydrolyzed copolymer is produced by the method that vinyl acetate and unsaturated caboxylic acid are copolymerized by means of a solution polymerization so as to obtain a copolymer having the above monomer ratio and the obtained copolymer is hydrolyzed up to the above-mentioned degree of hydrolysis in the presence of an alkaline catalyst such as caustic soda or sodium methylate. Into the hydrolyzed copolymer is given a considerably hygrosecopic properties by further heat-treatment. In general, the component (B) is heat-treated at 110° to 200° C. for 1 to 360 minutes in air or inert gas. The obtained copolymer is powder form. However, it may be put to practical use by selecting or pulverizing into a suitable particle size.

As a short cut fibrous material as the component (C), there can be optionally employed a cut natural fiber such as cut rayon staple, wool or cotton; cut synthetic fiber such as nylon, polyester, polyvinyl chloride, polyvinylidene chloride, polyolefin or vinylon; pulp powder; glass fiber; ceramic fiber; cut asbestos fiber; cut metallic fiber such as iron or copper fiber; or cut animal hair. It is preferable that the short cut fibrous material has a diameter of about 0.1 to about 0.002 mm and a length of about 15 to about 0.005 mm.

The weight ratio of the component (A)/the component (B) is 9/1 to 1/9, preferably 7/3 to 1/9. In case the weight ratio of the component (A)/the component (B) is more than 9/1, the desiccating agent may be temporarily liquefied. In case the ratio is not more than 1/9, it tends to fail the hygroscopic power of the desiccating agent at low temperature under high humidity. Thereafter, it is necessary to be selected the suitable ratio from the above range as occasion demands.

And, when the component (C) is admixed with the component (A) and the component (B), it is favorable that the weight ratio of [the component (A) and the component (B)]/the component (C) is 19/1 to 1/19, preferably 19/1 to 9/11. In case the ratio is less than 1/19, the hydroscopicity of the desiccating agent lowers. On the other hand, in case the ratio is more than 19/1, the desiccating agent cannot be repeatedly recycled more than 10 times.

The components (A), (B) and (C) can be admixed by a variety of methods. For instance, the component (A), the component (B) and the components (C) are admixed in the form of powder, respectively, or the mixture of the powder component (B) and the component (C) are impregnated with the solution of component (A).

The mixture of the components (A), (B) and (C) may be molded into various articles such as sheet, bar, fiber, ball and dice.

In the production of the desiccating agent of the present invention, of course, it is possible to employ various binder components such as polyvinyl alcohols and cellulose derivatives.

The desiccating agent can be employed to absorb the humidity in lumber room, closet and cabinet of house; package of precision machine and electronic parts. Also, the desiccating agent absorbed much moisture can liberate the moisture when it is allowing to stand in a low humidity circumstances, and therefore is preferably used to control the humidity.

The desiccating agent can be repeatedly recycled because it is possible that the desiccating agent gets back the original dry state, even if it is winter, by means of drying method that the desiccating agent is exposed to the sunlight or placed under air stream of at least 25° C. in low humidity after absorbing moisture. And moreover, it is not liable to lower the hygroscopic power of the desiccating agent, even if the recycle is repeated at least 10 times.

The present invention is more specifically described and explained by means of the following Examples. It is to be understood that the present invention is not limited to the Examples, and various changes and modifications may be made in the invention without departing from the spirit and scope thereof.

EXAMPLE 1

Component (A): a calcium chloride dihydrate powder
Component (B): a hydrolyzed monomethyl maleate-vinyl acetate copolymer powder having 96.1% by mole of vinyl acetate and 3.0% by mole of monomethyl maleate in which a degree of hydrolysis of the vinyl acetate component is 98.1% by mole (diameter: at most 295 μm)
Component (C): staple rayon (diameter: 0.1 to 0.05 mm, length: 1 to 1 5 mm)

The components (A), (B) and (C) were admixed in amounts shown in Table 1, and the mixture was placed in a laboratory dish. The mixture was allowed to stand for 30 hours in 90% RH, and the moisture absorption ratio was measured according to the following equation.

$$\left( \frac{\text{Weight of water-absorbed desiccating agent (g)}}{\text{Weight of desiccating agent (g)}} - 1 \right) \times 100\ (\%)$$

Thereafter, the desiccating aggent was sun-dried so that a moisture absorption ratio of the desiccating agent was not more than 1% by weight, and then the desiccating agent absorbed water under the same condition as in the above-mentioned. A recycle test of absorption-desorption of the desiccating agent was repeated 15 times. The results are shown in Table 1.

TABLE 1

| Desiccating agent (parts) | | | Moisture absorption ratio of desiccating agent (% by weight) | |
|---|---|---|---|---|
| Component (A) | Component (B) | Component (C) | First time | 15th time |
| 70 | 39 | 8 | 195 | 190 |
| 70 | 35 | 12 | 184 | 180 |
| 70 | 29 | 18 | 160 | 159 |
| 70 | 18 | 29 | 155 | 154 |
| 33 | 10 | 55 | 150 | 149 |
| 60 | 40 | 0 | 170 | 100 |

EXAMPLE 2

The procedures of Example 1 were repeated except that a powder of hydrolyzed monomethyl maleate-vinyl acetate copolymer having 90% by mole of vinyl acetate and 10% by mole of monomethyl maleate in which a degree of hydrolysis of the vinyl acetate component is 96% by mole was employed instead of the component (B) in Example 1.

The results are shown in Table 2.

TABLE 2

| Desiccating agent (parts) | | | Moisture absorption ratio or desiccating agent (% by weight) | |
|---|---|---|---|---|
| Component (A) | Component (B) | Component (C) | First time | 15th time |
| 70 | 39 | 8 | 191 | 186 |
| 70 | 29 | 18 | 160 | 158 |

EXAMPLES 3 to 5

The procedures of Example 1 were repeated except that the component (C) shown in Table 3 was employed instead of the component (C) in Example 1.

The results are shown in Table 3.

TABLE 3

| Component (C) | Component (C) Diameter (mm) | Length (mm) | (A)/(B)/(C) | Moisture absorption ratio (%) First time | 15th time |
|---|---|---|---|---|---|
| Cellulose powder (made by Sanyo Kokusaku Pulp Co., Ltd.) | 0.02 to 0.01 | 0.3 to 0.05 | 70/32/15 | 183 | 175 |
| Glass fiber (made by Nitto Boseki Co., Ltd.) | 0.013 | 1.5 | 70/47/10 | 200 | 177 |
| Ceramic fiber (made by | 0.028 | 2 to 10 | 70/47/10 | 198 | 169 |

TABLE 3-continued

| Component (C) | Component (C) Diameter (mm) | Length (mm) | (A)/(B)/(C) | Moisture absorption ratio (%) First time | 15th time |
|---|---|---|---|---|---|
| Isolite Insulating Products Co., Ltd.) | | | | | |

EXAMPLES 6 and 7

The components (A), (B) and (C) in Example 1 were dispersed into a 2% by weight aqueous polyvinyl alcohol (an average degree of hydrolysis: 99.3% by mole and an average degree of polymerization: 1680) solution, molded, formed, dried and pulverized to obtain a granular desiccating agent.

The desiccating agent was placed in a laboratory dish, and allowed to stand for 30 hours in 90% RH at 20° C., and a moisture absorption ratio was measured. Thereafter, the absorbed desiccating agent was dried by allowing to stand for 30 hours in 45% RH at 20° C. A recycle test of absorption-desorption of the desiccating agent was repeated 15 times or 30 times.

The results are shown in Table 4.

TABLE 4

| Desiccating agent (parts) | | | Moisture absorption ratio of desiccating agent (% by weight) | | |
|---|---|---|---|---|---|
| Component (A) | Component (B) | Component (C) | First time | 15th time | 30th time |
| 40 | 10 | 50 | 130 | 126 | 124 |
| 53 | 20 | 40 | 161 | 159 | 157 |

In addition to the ingredients employed in Examples, other ingredients can be employed in Examples as set forth in the specification to obtain substantially the same results.

What we claim is:

1. A desiccating agent comprising a mixture of
(A) a deliquescent salt,
(B) a hydrolyzed copolymer containing 50 to 99.8% by mole of vinyl acetate and 50 to 0.2% by mole of an unsaturated dicarboxylic acid or ester thereof in which a degree of hydrolysis of the vinyl acetate component is not less than 70% by mole, and
(C) a fibrous material having a diameter of 0.1 to 0.002 mm and a length of 15 to 0.005 mm as main components.

2. The desiccating agent of claim 1, wherein a weight ratio of said component (A)/said component (B) is 9/1 to 1/9 and a weight ratio of [said component (A) and said component (B)]/said component (C) is 19/1 to 1/19.

3. The desiccating agent of claim 2, wherein a weight ratio of said component (A)/said component (B) is 7/3 to 1/9.

4. The desiccating agent of claim 2, wherein a weight ratio of [said component (A) and said component (B)]/said component (C) is 19/1 to 9/11.

5. The desiccating agent of claim 1, wherein said component (A) is calcium chloride, magnesium chloride or lithium chloride.

6. The desiccating agent of claim 5, wherein said calcium chloride has a water of crystallization.

7. The desiccating agent of claim 1, wherein said component (B) is a hydrolyzed copolymer of 80 to 99.8% by mole of vinyl acetate and 20 to 0.2% by mole of an unsaturated dicarboxylic acid or ester thereof.

8. The desiccating agent of claim 1, wherein said unsaturated dicarboxylic acid is selected from the group consisting of maleic acid (anhydride), fumaric acid, itaconic acid, glutaconic acid, and allylmalonic acid and the ester is selected from the group consisting of maleic acid ester, fumaric acid ester, itaconic acid ester, glutaconic acid ester, and allylmalonic acid ester.

9. The desiccating agent of claim 1, wherein said component (B) contains further another monomer unit capable of copolymerizing with vinyl acetate and the unsaturated carboxylic acid or ester thereof.

10. The desiccating agent of claim 1, wherein said component (B) is heat-treated.

11. The desiccating agent of claim 1, wherein said component (C) is cut natural fiber, cut synthetic fiber, pulp powder, glass fiber, ceramic fiber, cut asbestos fiber, cut metallic fiber or cut animal hair.

* * * * *